Nov. 2, 1965  P. J. CLEMM  3,215,563
POROUS ELECTRODE AND METHOD OF PREPARING THE ELECTRODE
Filed May 15, 1962
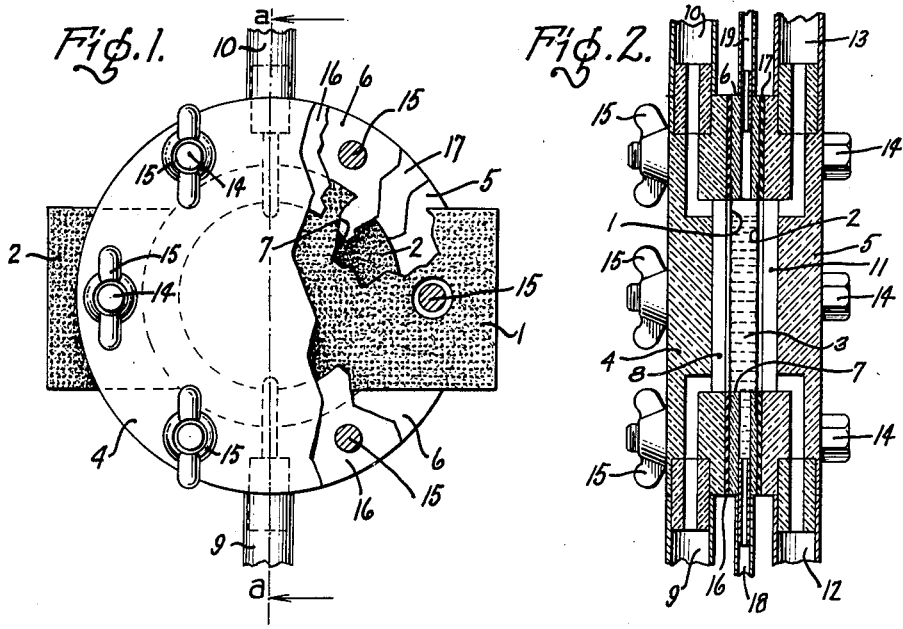
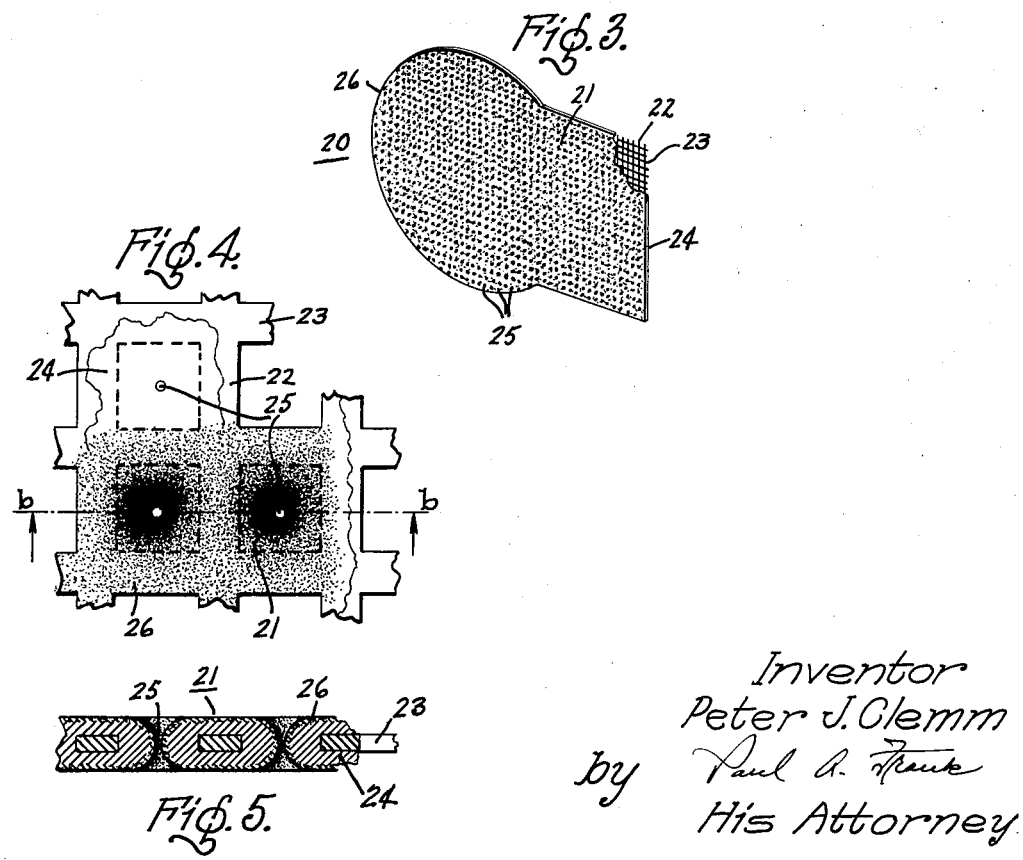
Inventor
Peter J. Clemm
by Paul A. Frank
His Attorney United States Patent Office 3,215,563
Patented Nov. 2, 1965

3,215,563
POROUS ELECTRODE AND METHOD OF
PREPARING THE ELECTRODE
Peter J. Clemm, Ballston Lake, N.Y., assignor to General
Electric Company, a corporation of New York
Filed May 15, 1962, Ser. No. 194,795
8 Claims. (Cl. 136—86)

This invention pertains generally to porous electrode structures useful in electrochemical devices and to novel methods for preparing the electrode structures. More particularly, the present invention relates to novel porous electrodes with a uniform pore structure that are less apt to exhibit the polarization losses encountered in use of conventional porous electrodes. Specifically, this invention relates to a type porous electrode having a pore structure limited essentially to openings which extend completely through the electrode member and are of a particular configuration, especially suited for establishing a gas-liquid interface within the individual pores.

Conventional porous electrodes for galvanic cells, batteries, and the like, generally comprise compacted sintered masses of individual metallic particles which catalytically induce the electrochemical reaction to take place on the electrode surface. In a primary galvanic cell of the type commonly called "a fuel cell," utilizing porous electrodes, electricity is generated in the cell by catalytic conversion of hydrogen at the anode electrode concurrent with catalytic conversion of oxygen at the cathode electrode in an arrangement whereby the electrodes are separated by a layer of electrolyte of an alkaline or acid material. The hydrogen gas commonly employed in this device as the fuel component is ionized at the anode to produce hydrogen ions by reaction which releases two electrons to the electrode. If the cell employs oxygen gas as the oxidant material in the electrochemical reaction, together with an alkaline electrolyte, the cathode reaction forms hydroxyl ions which migrate and react with hydrogen ions forming water as a product. Ionization of the fuel and oxidant gases generally occurs after sorption of the particular reactant gas on the catalytically active metal constituent of the respective electrode member. In conventional gaseous fuel cells, wherein both electrodes are of the porous nature described, the sorbed gases undergo reaction at a three-phase boundary in the electrode pores between the gas, liquid electrolyte, and electrode by a mechanism which liberates electrons at the anode and requires electrons for the reaction at the cathode. The potential difference between the electrodes enables the electrons to do electrical work on an external resistive load connected between the two electrodes. The electrolyte which is in contact with both the anode and cathode takes part in the over-all electrochemical cell reaction and completes the electrical circuit of the cell.

Conventional porous electrodes exhibit unsatisfactory performance characteristics indicated by high polarization losses, "drowning" of the electrodes, and other undesirable manifestations which can be attributed directly to the pore structure of the electrode. More particularly, the pore structure in conventional electrodes comprises a random size connected series of openings created by the void spaces between the individual particles making up the electrode mass leading to performance behavior in the cell dependent upon the particular variations in the pore size for the individual electrode. Exhaustive investigations have been made to increase the uniformity of pore size in the production of porous electrodes without a great deal of success. One method attempted to increase the uniformity of pore size has been to select particles of substantially the same size for preparation of the electrode structures, together with utilization of uniform pressures and temperatures for preparation of the final compacted mass serving as the electrode. Unfortunately, deformation of the individual particles yields a variable pore size member. Still another method followed to increase the uniformity and pore size of the conventional electrodes has been to impregnate the pores of a final member prepared in the described manner with a solid so as to block the smaller pores and achieve a more uniform pore size with the larger openings of the member. While the latter method is said to reduce the variation in pore size, it cannot eliminate the variation completely and does not remedy many of the other disadvantages inherent in a porous electrode member having this type of structure. For example, the passageways for transport of the gaseous reactants and the electrolyte into the member for reaction at the three-phase boundary hereinbefore mentioned are labyrinthine and tortuous which results in undesirable concentration gradients of the reactants along the passages. In addition, many of the passageways do not extend completely through the electrode member so as to result in so-called "dead-end" regions where there can be no formation of the necessary three-phase boundary for the electrochemical reaction in the cell. Drowning of conventional electrodes is often encountered from an electrolyte film covering at least a substantial portion of the electrode face in contact with a reactant thereby preventing formation of the gas-liquid interface within the individual pores. More particularly, variations in pore size and configuration permit capillary forces to urge electrolyte from the smaller pores to the gas surface with even a minor decrease in operating gas pressure. Conventional electrodes are also very subject to "blowing out" gas into the main electrolyte chamber of the cell with a minor increase in operating gas pressure. In view of the existing difficulties with conventional electrodes, it would be highly desirable to prepare an electrode having a simplified uniform pore structure to promote over-all cell efficiency, uniform performance, and ease of regulation.

It is an important object of the invention, therefore, to prepare a novel electrode structure having direct uniform openings between major surfaces of the electrode.

It is another important object of the invention to provide a porous fuel cell electrode with a novel pore configuration that assists formation of a three-phase boundary reaction site within each individual pore.

Still another important object of the invention is to provide a porous electrode having greater freedom from "drowning" or "blowing out" than conventional electrodes.

Yet another important object of the invention is to provide novel methods for the preparation of a porous electrode structure.

These and other important objects and advantages of my invention will be apparent from the following description taken in connection with the accompanying drawings in which:

FIGURE 1 is a front view of an assembled fuel cell employing the novel electrodes of the invention;

FIGURE 2 is a cross-sectional view taken along lines a—a in FIGURE 1;

FIGURE 3 is a perspective view of the electrode structure employed in the cell of FIGURES 1 and 2;

FIGURE 4 is a greatly magnified view of a portion of the electrode shown in FIGURE 3 illustrating the individual pore openings and other details of the electrode construction; and FIGURE 5 is a cross-sectional view taken along lines b—b in FIGURE 4.

Briefly, the novel electrode structures of the invention are porous metal electrodes having an idealized pore structure which comprises a gas-impervious matrix member with regularly spaced capillary openings extending completely through the matrix member in a direction substantially normal to the major surfaces of the said matrix member, the opening being characterized by a venturi-shaped profile with a substantially uniform throat diameter. The term "venturi" used hereinafter in the specification and claims is used in its regular sense to signify a channel or path for fluid having a passageway consisting of two truncated cones connected directly at the small ends, or alternately, interconnected at said small ends by a short cylinder. The additional term "throat diameter" used to further define the venturi-shaped profiles of the pore structure in the present novel electrodes signifies the narrow vena contracts section of the venturi channel.

In the preferred fuel cell device illustrated in FIGURE 1, two electrodes of the invention are immersed in an aqueous alkaline electrolyte with the arrangement being contained in a suitable housing member permitting concurrent introduction of a gaseous fuel and oxidant to the exposed faces of the respective electrodes. With the concurrent admission of the fuel and oxidant gases to the electrodes, an electrical potential is created by the electrochemical reaction in the cell which generates current collected at the electrodes and conveyed to the external circuit of the cell by means of the electrical connections to the electrodes. Products of the cell reaction are permitted to diffuse through the electrode pores and may be exhausted from the cell with any unreacted gases. The general construction and operating characteristics of the low temperature gaseous fuel cell described are so well known and contained in the open literature that further descriptive details of the cell are not considered necessary in the specification.

The assembled low temperature gaseous fuel cell in FIGURE 1 comprises two circularly shaped electrode members 1 and 2, being spaced apart in the liquid electrolyte 3, electrode housing member 4 for supporting the anode electrode 1 and having means for supplying a gaseous fuel to the anode, electrode housing member 5 for supporting the cathode electrode 2 and having means for supplying a gaseous oxidant to said cathode, and electrolyte chamber 6 being disposed between the electrode housing members and having supply means for replenishing electrolyte in the central cavity defined by the circular wall 7 of said member. Electrical connection to an external load circuit from the cell may be made conveniently by means of attaching leads to the tab sections of the electrodes projecting outwardly in opposite directions from the body of the cell. Housing member 4 comprises conveniently a plastic shape having cavity portion 8 for admission of a suitable fuel gas which can be hydrogen, carbon monoxide, or a gaseous hydrocarbon, and the like, to the exposed face of the anode through conduit member 9 with additional conduit means 10 for exhausting any unreacted fuel gas from the cavity. Likewise, housing member 5 comprises a plastic shape having cavity portion 11 with conduit means 12 and 13 for circulating an oxidant gas to the cathode electrode. Electrolyte chamber 6 comprises simply a ring shaped plastic member which defines an electrolyte cavity between the abutting faces of the electrodes and the circular wall 7 constituting the internal diameter of the ring member. The separate housing members, electrodes, and central electrolyte chamber are held in face-to-face relationship with studs 14 and wing nuts 15 as shown in the drawing. No particular insulating means are required in the described cell to prevent direct electrical connection between the electrodes since the dielectric nature of the ordinary plastic materials used for the housing members and electrolyte chamber satisfies the requirement. Gasket rings 16 and 17 which are disposed between the flat faces of the housing members and electrolyte chamber and which may be constructed conveniently from an inert deformable solid, such as rubber, elastomeric polymers, asbestos, and the like, engage the electrode faces and prevent leakage of electrolyte from the assembly at the electrodes. Passages 18 and 19 extending from the periphery of the electrolyte chamber member provide optional means for replenishing electrolyte to the cell and may conveniently be connected to a reservoir system for automatically adjusting the level of electrolyte in the cell by suitable siphoning or pressure responsive arrangements.

It is not intended to limit the general cell configuration of the invention to the embodiment of the drawings since it will be obvious that different cell designs will still operate in the previously indicated manner. While a preference has been expressed for construction of cell housing members from plastic materials to simplify fabrication, it is likewise within contemplation of the invention to employ ceramic materials or metals for part or complete construction of the cell body. While construction of the entire housing from a ceramic material would not require the incorporation of electrical insulation to prevent a low resistance electrical path between electrodes, use of metal members for even greater mechanical strength necessitates insulation between the members in the embodiment shown.

The porous electrodes of the invention, when employed in a gaseous fuel cell as above described, are preferably of extremely thin cross section, less than 0.002 inch to minimize chemical concentration gradients across the electrode during cell operation. The pores of the electrode consist only of individual openings extending between both major surfaces of the member, preferably in the direction normal to said surfaces, the openings having a venturi-shaped profile with a substantially uniform throat diameter. The cross section of the openings are of capillary size at least in the throat section so that surface tension forces operating on the electrolyte in the pores counter-balance the gas pressure being exerted from the opposite side of the electrode to establish the desired three-phase boundary. It is more advantageous to have a major portion or all of the pore cross section in the capillary size range in order to minimize loss of three-phase boundary from fluctuating gas pressures.

An electrode having all the described characteristics is prepared by a novel process which includes direct deposition of metal onto a suitable substrate in the configuration of the desired openings. A preferred method by which the electrode member is formed comprises depositing a thin photoresist layer onto a flat surface, exposing the photoresist layer to actinic radiation in a grid pattern which insolubilizes the exposed portions of the photoresist layer, dissolving away the unexposed and still soluble grid element portions of the photoresist layer, depositing metal into the void spaces of the photoresist layer forming a grid member of the metal, separating the grid member from the photoresist layer and electrodepositing metal on the grid member to increase its thickness while also reducing the grid opening sizes of the member and forming capillaries with a venturi-shaped profile. If the metal being deposited according to the described process is one which will act as a catalyst for the particular electrode reaction and will also sorb the particular reactant gas, a suitable electrode is obtained directly upon electrodeposition of the catalyst member. On the other hand, it may be desirable for economy or ease of fabrication to prepare a metal electrode having the physical configuration according to the invention from a metal which is not a catalyst for the electrochemical reaction and thereafter deposit on the metal surface a layer of a catalyst metal having the necessary surface activity. Effective surface catalyst layers of Raney nickel, palladium, platinum, and the like, can be used in this fashion.

To illustrate in greater detail one preferred method for the preparation of electrode structures according to the invention, a thin layer having a thickness of approximately 0.0002 inch of a commercial polyvinyl cinnamate photoresist material is deposited on an electrically conducting plate by known techniques from an organic liquid solution of the polymer. The solid photoresist layer is exposed to actinic radiation in the form of ultraviolet light in an image pattern obtained by projecting the illumination through the openings of a screen-type grid. Exposure of the photoresist material to actinic radiation partially insolublizes the exposed portions, permitting contact of the layer with a solvent so as to dissolve the soluble material and leave behind a pattern of the insolublized portions of the layer. A suitable pattern in the photoresist layer for subsequent formation of the electrode structure comprises separate islands of the insolublized material, representing the grid openings, which leaves void spaces corresponding to the grid elements in the original structure. This pattern is obtained by exposing the photoresist layer to a reversed image of the particular screen configuration. The developed photoresist layer, which is still supported on the conducting plate substrate, is thereafter immersed into a plating solution of nickel and made the cathode member during an otherwise conventional plating process. A thickness of nickel is deposited in the void spaces on the photoresist layer up to a height of the photoresist layer whereupon plating is discontinued for detachment of the plated structure from the substrate. The electro-formed screen is thereafter again immersed in the nickel plating solution for additional plating on both sides of the screen member to an over-all thickness of approximately 0.001 to 0.0015 inch. The last mentioned plating step also reduces the size of the holes to a desired size of from about 5–10 microns in diameter at the throat section of the venturi-shape openings obtained by this method. In this manner, a porous electrode structure is prepared having openings spaced apart approximately 25–50 microns which results in a number of openings ranging from approximately one million holes per square inch of electrode surface to about two hundred fifty thousand openings per square inch of the surface area, respectively.

A preferred method for depositing a thin surface layer of highly reactive catalyst metal on the electrode surface employs vapor deposition of the catalyst material. Vapor deposition of the catalyst is preferred over solvent coating and other conventional techniques because large proprotions of the catalyst metal are deposited directly in the openings of the electrode member. It is also possible to form a surface active catalyst layer in situ by vapor deposition wherein two or more vaporized metals are codeposited on the electrode surface. A Raney nickel surface catalyst layer is produced according to this method by codepositing approximately equal amounts by weight of nickel and aluminum in a vacuum jar containing separately controllable sources of the individual metals. It is desirable to prepare the metal surface of the electrode for the deposition of the catalyst layer in order to enhance adherence of the catalyst to the substrate by first degreasing the member followed by cleaning with an equipart aqueous solution of an acid, which is followed by a water rinse to prevent further possible corrosive attack by the acid. This treatment may be followed by heating to about 700° C. in dry hydrogen to remove any traces of oxide formation on the metal surface. In the preferred process for depositing a Raney nickel surface layer on the electrode, the nickel source is first heated to volatilize the metal in a vacuum atmosphere and deposit a base coating of nickel on the electrode substrate. After depositing only a very thin layer of nickel, perhaps amounting to a few molecules in thickness, the aluminum source is heated and for a period of about 30 seconds or so, both materials are codeposited at about an equal rate on the substrate, after which further heating of the nickel source is discontinued while aluminum deposition is still continued. In this manner of deposition, a desired equal aluminum-to-nickel ratio for Raney nickel will be achieved in the surface layer. The electrode member is heated during deposition of the surface layer to produce a more homogeneous alloy or intermetallic product of deposition which is followed by further heat treatment in vacuum of the final member at approximately 450° C. for this same purpose. Activation of the surface catalyst layer is achieved by leaching out the aluminum in a 30% aqueous solution of potassium hydroxide or sodium hydroxide.

In FIGURE 3 there is illustrated in perspective view an electrode structure prepared in the above described manner. The porous metal electrode 20 having the idealized pore structure of the invention comprises a gas impervious matrix member 21 provided by the intersecting screen grid elements 22 and 23 rendered imperforate by deposited metal 24 in the screen openings except for the residual capillary openings 25 shown extending completely through the matrix member in a direction substantially normal to the major surfaces of the said matrix member and surface catalyst layer 26 which extends over the major surfaces of the electrode member and into the capillary openings.

FIGURE 4 represents a greatly magnified view of the electrode structure in FIGURE 3 showing in closer detail the configuration of the individual components constituting the member and especially the surface catalyst layer. The same reference numerals are employed to identify the individual components in both FIGURES 3 and 4 for clarity of illustration.

In FIGURE 5 there is shown a cross section of the capillary openings along lines b—b in FIGURE 4 so as to depict clearly the profile of the individual capillary openings together with the disposition of the catalyst layer in the electrode structure. The variation in diameter of the electrode pores will be governed by the known laws of capillarity so as to establish the liquid meniscus which constitutes the three-phase boundary within the individual pore. It will be advantageous to maintain the variation between the large diameter at the opening of the pore and the throat diameter greater than possible variation in average diameter amongst the pores so that a three-phase boundary will be established within each individual pore. It will be further advantageous to construct the electrode with as thin a cross section as consistent with structural needs at the operating conditions of the cell in order to minimize concentration gradients in the pores which increase polarization losses at the electrodes. Since the type fuel cells above described are operated satisfactorily with the reactant gases being introduced into the cell at positive pressures only slightly above atmospheric pressure, it is possible to employ electrodes having a cross-sectional thickness less than 0.002 inch which for the throat diameter sizes hereinbefore mentioned desirably reduces the opening length to throat diameter ratio to less than about 10.

To illustrate the performance characteristics for electrodes of the invention, nickel electrodes were prepared having platinum black and Raney nickel deposits on the nickel member in the form of thin surface layers extending into the pore openings. Accordingly, 0.0015 inch thick nickel electrodes having 5 micron diameter pores with approximately 250,000 pores per square inch of electrode surface area were electroplated with platinum black catalyst. The electroplating was conducted by immersing the electrodes in a 2% by weight platinic chloride solution in 2 N hydrochloric acid and depositing platinum thereon at current densities of about 20 milliamperes per square centimeter for approximately 30 minutes, whereupon the entire surface area of the electrodes achieved the characteristic black coloration of the deposit. The polarization curves of the platinized electrodes measured in 6 N potassium hydroxide electrolyte at room temperatures against a saturated calomel reference electrode is listed in tabular form below.

| E.M.F. (volts) | Current density (ma./cm.$^2$) |
|---|---|
| 1.14 | 0 |
| 1.13 | 5 |
| 1.09 | 10 |
| 1.02 | 17 |
| 0.97 | 25 |
| 0.87 | 45 |
| 0.78 | 66 |
| 0.69 | 87 |

Other nickel electrodes of approximately 0.001 to 0.0015 thickness and having 5–10 micron pores with approximately 250,000 pores per square inch of electrode surface area and approximately 1,000,000 pores per square inch were prepared with a Raney nickel surface catalyst layer in the manner hereinbefore described. Open circuits potentials of the final electrodes measured in 6 N potassium hydroxide at room temperature against a saturated calomel reference electrode were 1.15 volts for both the 250,000 and 1,000,000 openings per square inch members. A three-phase boundary of gas and electrolyte was maintained with ease in the individual pores of the catalyst coated electrodes without occasioning the "drowning" and "blowing out" phenomena encountered in conventional porous electrodes.

While a preference has been indicated for preparation of the electrode structure by electroplating metal on a screen or grid substrate, it is within contemplation of the invention to fabricate the member by other techniques. For example, it is deemed permissible to deposit metal onto a grid member having regular polygonal openings by other electroforming processes including electrophoresis, and the like, although closer control of the capillary openings in the final electrode structure is obtained by the preferred electroplating technique. It is also deemed possible to deposit metal in the openings of a woven grid or mesh of inert polymeric material by processes such as vapor deposition to form the desired electrode structure. Electrode structures having the characteristic venturi-shape capillary openings may also be obtained by etching a metal foil member in a particular manner. More particularly, a thin metal foil member is coated on both major surfaces with layers of photoresist material which are subsequently exposed to actinic radiation in an image pattern of the final hole openings. Proper alignment of the hole openings requires register of the image patterns on both photoresist layers which can be achieved simply with pilot holes in the foil or other known registration techniques. After light exposure of the photoresist layers followed by dissolving away the exposed hole openings with a solvent for the photoresist material, the holes are etched by contacting both photoresist layers with a suitable etchant for the metal foil. Since the hole openings are in register, concurrent etching from both sides of the metal foil will ultimately produce a through hole of diminishing diameter as the depth of the openings increase from each major face of the foil. Termination of etching may be accomplished simply by displacing the electrode from the etching bath and removing any residual etchant with a non-corrosive solvent to prevent further attack of the metal. Complete removal of the photoresist material after etching is optional since presence of the layers will not affect proper operation of the electrode and may reduce corrosion at the electrode during cell operation if the photoresist material is inert to the particular electrolyte in the cell.

Suitable catalyst metals for the electrode structures of the invention are electron conductors which will sorb the fuel or oxident employed and act as a catalyst for the electrode reaction while not oxidizing severely under the operating conditions of the cell. Suitable gas sorbing metals are well known and many are described, for example, in "Catalysts, Inorganic and Organic," Berkman, Morrel, and Egloff, Reinhold Publishing Company, New York (1940); "Catalytic Chemistry," W. H. Lohse, Chemical Publishing Company, Inc., New York (1945); etc. Suitable metals include the noble metals of Group VIII Series of Metals in the Periodic Table of Elements which include rhodium, ruthenium, palladium, osmium, iridium, and platinum; other suitable metals include the other metals of Group VIII, for example, nickle, iron, cobalt, etc.; as well as other metals to known catalytically sorb gases, for example, silver and copper; and metals of the transition series, for example, manganese, vanadium, rhenium, etc. Additionally, alloys of the mentioned metals are deemed suitable catalyst materials.

From the foregoing description, it will be apparent that an improved porous electrode having an idealized pore structure has been provided. Additionally, use of the novel electrode member in certain electrochemical devices such as gaseous fuel cells have been shown to provide improved cell operation. It is not intended to limit the invention to the preferred embodiments above shown, however, since it will be obvious to those skilled in the art that certain modifications of the present teachings can be made without departing from the true spirit and scope of the invention. It is intended to limit the present invention, therefore, only to the scope of the following claims.

What I claim as new and desire to secure by Letters Patent of the United States is:

1. A fuel cell comprising an electrolyte, two porous electrodes, means for feeding a gaseous fuel to one of said electrodes and a gaseous oxidizer to the other of said electrodes, at least one of said electrodes having an idealized pore structure which comprises a gas impervious sheet-like metallic matrix member having regularly spaced unobstructed openings extending completely through the matrix member in a direction substantially normal to the major surfaces of said matrix member, and each of said openings having a venturi-shaped profile with a minimum diameter in the venturi throat section of from about 5 to 10 microns.

2. The combination of claim 1 in which said openings have smooth rounded entrances at both ends of the openings and a relatively regular contour throughout.

3. The combination of claim 1 in which said openings have a length-to-throat diameter ratio less than about 10:1.

4. The combination of claim 1 in which said matrix member is provided with an overlying surface layer of catalyst metal on the matrix member and extending into the openings.

5. The combination of claim 1 in which said matrix member is provided with an overlying surface layer of Raney nickel formed in situ on the matrix member and extending into the openings.

6. The combination of claim 1 in which said matrix member is provided with an overlying surface layer of catalyst metal on the matrix member and extending into the openings uniformly coating the opening walls.

7. The combination as recited in claim 6 in which said overlying surface layer comprises a codeposit of at least two catalyst metals.

8. The combination as recited in claim 1 in which said matrix member is composed of nickel having a vapor-deposited layer of nickel bonded to its surface, said layer extending into said openings and a surface layer of Raney nickel formed in situ overlying the subjacent nickel layer.

(References on following page)

References Cited by the Examiner

UNITED STATES PATENTS

| | | | |
|---|---|---|---|
| 2,217,334 | 10/40 | Diggory et al. | 204—15 |
| 2,226,381 | 12/40 | Norris | 204—11 |
| 2,765,230 | 10/56 | Tinklenberg | 204—11 |
| 2,947,797 | 8/60 | Justi et al. | 136—120 |
| 3,117,034 | 1/64 | Tirrell | 136—120 |

FOREIGN PATENTS 667,298  2/52  Great Britain.

JOHN H. MACK, *Primary Examiner.*